(12) United States Patent
Pattison et al.

(10) Patent No.: US 9,623,333 B2
(45) Date of Patent: Apr. 18, 2017

(54) METHOD AND MECHANISM FOR IMPLEMENTING A GAMIFICATION APPLICATION

(71) Applicant: Oracle International Corporation, Redwood Shores, CA (US)

(72) Inventors: Laurie Pattison, Reno, NV (US); Erika Webb, Boulder, CO (US); Ultan O'Broin, Half Moon Bay, CA (US); Antonio Aguilar, Zapopan (MX); Eduardo Lopez, Zapopan (MX); Evert Gonzalez, Zapopan (MX); Andrea Cantu, Monterrey (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 536 days.

(21) Appl. No.: 13/915,914

(22) Filed: Jun. 12, 2013

(65) Prior Publication Data
US 2013/0337909 A1    Dec. 19, 2013

Related U.S. Application Data

(60) Provisional application No. 61/659,120, filed on Jun. 13, 2012, provisional application No. 61/777,444, filed on Mar. 12, 2013.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/65 | (2014.01) | |
| A63F 13/60 | (2014.01) | |
| G06Q 10/06 | (2012.01) | |

(52) U.S. Cl.
CPC .............. *A63F 13/65* (2014.09); *A63F 13/00* (2013.01); *A63F 13/60* (2014.09); *G06Q 10/0639* (2013.01)

(58) Field of Classification Search
CPC ................ A63F 13/85; A63F 2300/556; A63F 2300/558; A63F 2300/61
See application file for complete search history.

(56) References Cited

U.S. PATENT DOCUMENTS

| | | |
|---|---|---|
| 8,768,751 B2 | 7/2014 | Jakowski et al. |
| 2006/0258463 A1* | 11/2006 | Cugno et al. ................... 463/42 |

(Continued)

OTHER PUBLICATIONS

Xbox Live Wikipedia Page, Jun. 12, 2011, <https://en.wikipedia.org/w/index.php?title=Xbox_Live&oldid=433964854>.*

(Continued)

*Primary Examiner* — Milap Shah
*Assistant Examiner* — Jason Pinheiro
(74) *Attorney, Agent, or Firm* — Vista IP Law Group, LLP

(57) ABSTRACT

Disclosed is an improved approach to implement gamification of applications and activities. The approach can be used to create gamification for any application/activity. In some approaches, gamification is provided such that an application is not modified to include the game features. Instead, an external stand-alone gamification mechanism is provided to include the game features, where the external gamification mechanism is used in conjunction with the activity/application.

17 Claims, 31 Drawing Sheets

(56) References Cited

U.S. PATENT DOCUMENTS

| | | | |
|---|---|---|---|
| 2010/0331075 A1 | 12/2010 | Michelstein et al. | |
| 2012/0270661 A1* | 10/2012 | Smith | A63F 13/12 463/42 |
| 2013/0096981 A1 | 4/2013 | Evans et al. | |
| 2013/0337909 A1 | 12/2013 | Pattison et al. | |
| 2014/0051506 A1 | 2/2014 | Ameling et al. | |
| 2014/0164037 A1 | 6/2014 | Rao et al. | |
| 2016/0089606 A1 | 3/2016 | Javed Lal Mohammed Ameerjan et al. | |

OTHER PUBLICATIONS

Playstation Network Wikipedia Page, Jun. 9, 2011, <https://en.wikipedia.org/w/index.php?title=PlayStation_Network&oldid=433449791>.*

Model-view-controller Wikipedia Page, Jun. 9, 2011, <https://en.wikipedia.org/w/index.php?title=Model%E2%80%93view%E2%80%93controller&oldid=433393254>.*

Nuvana, Products, Aug. 7, 2012, 2 pages.

Rogsimons, "The Undercover Boss and the Gamification of Corporate Values", Blog, Jul. 22, 2013, 6 pages.

Rise Blog, "Mahara UK gamified event case study", Sep. 26, 2014, 1 page.

VoiceStorm, FAQs, The Only Employee Advocacy Platform that partners with your workforce and turns them into powerful brand amplifiers, Mar. 23, 2013, 2 pages.

VoiceStorm, The Only Employee Advocacy Platform that partners with your workforce and turns them into powerful brand amplifiers, Mar. 23, 2013, 5 pages.

Zach Watson, "3 Gamification Solutions for Enterprise", Jun. 9, 2014, 2 pages.

Ambitions, "Dynamic, Sales Competitions, Analytics, and Reporting", Date accessed: Oct. 30, 2014, 9 pages <https://www.ambition.com/>.

Bunchball, "Building More Dynamic Teams with Gamification", Mar. 2013, 7 pages.

Barry Knack, "Launching a Gamification Practice in Your Contact Center", May 2014, 2 pages.

Congnizant, "Gamifying Business to Drive Employee Engagement and Performance", Sep. 2013, 10 pages.

Oracle, "JD Edwards EnterpriseOne Tools Auditing Administration Including 21 CFR Part 11 Administration Guide", Oracle Help Center, Copyright 2015, 10 pages.

* cited by examiner

206

210

414

422

//METHOD AND MECHANISM FOR IMPLEMENTING A GAMIFICATION APPLICATION

CROSS-REFERENCE TO RELATED APPLICATION

The present application claims the benefit of U.S. Provisional Application Ser. No. 61/659,120, filed on Jun. 13, 2012, and U.S. Provisional Application Ser. No. 61/777,444, filed on Mar. 12, 2013, which are hereby incorporated by reference in their entirety.

BACKGROUND

It is often challenging to be able to motivate and inspire people to perform an activity. For example, most organizations and companies that have employees seek to improve the means by which they motivate and inspire employees to perform their employment duties. Despite enormous amounts of research into this field of study, the subject of employee motivation is still not clearly understood and is often very poorly practiced.

As a result, employee engagement has been, and continues to be, a major issue to industry. Bored or disengaged employees represent a huge productivity cost to most companies and organizations. Incentive programs and rewards work as external motivation, but do not typically increase long-term motivation and productivity.

These problems are not limited to the employee/employment context, but similarly exist for any context in which it is desirable or necessary to motivate individuals, groups, and/or organizations. For example, the educational context is another common scenario in which there would be great value in having improved techniques for inspiring and creating higher levels of motivation.

Gamification is one approach that can be taken to create and enhance engagement of individuals and groups. Gamification refers to the application of game mechanics to engage users and to solve problems.

For example, many online sites utilize gamification concepts to enhance user experiences, often with the goal of enticing users to continue to visit the online sites on a more frequent basis and for longer durations of time. In a similar way, many software applications have been modified to include gamification concepts to enhance user interactions with the software application. Gamification tools and toolkits are now available that allow one to customize applications to include such gamification concepts and mechanisms.

The problem is that these prior approaches all require customized modifications to create specifically tailored applications that include the gamification concepts. Even with the availability of gamification toolkits, such customized programming and developments necessarily require significant amounts of investments in cost, time, and expertise to end up with a properly constructed and correctly operating application that includes the requisite game components—which is an endeavor that is more costly than is worthwhile for many applications that could nevertheless benefit from gamification concepts. Moreover, these customized applications include gamification mechanisms that are solely dedicated to, and limited in their usefulness for, the specific purposes for which the customized applications are directed.

As is evident, there is a great need for improved techniques to generally address the above-described problems relating to motivations of individuals, such as employee motivations. There is also a need for improved approaches to implement gamification concepts.

SUMMARY

According to some embodiments of the invention, described is an approach to implement gamification for applications. Gamification in this context refers to the application of game design principles and mechanics to application design. Gamification of an application can be used to drive participation and engagement by users of an application. In the business context, gamification can be used to motivate greater work participation and increase worker efficiencies to the organization.

Some embodiments of the invention are directed to an approach to create gamification for any application, which may include any activity or event. In some approaches, the invention is applied to provide gamification such that an application is not modified to include the game features. Instead, an external gamification mechanism is provided to include the game features, where the external gamification mechanism is used in conjunction with the activity/application. In this way the invention is applicable to any activity/application, without requiring costly retro-fitting to include the game features. Moreover, this allows the invention to be applied to an activity and application where it would be difficult, expensive, or impractical to modify to include the game features.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

The present disclosure provides an approach to implement gamification of applications. As used herein, gamification refers to the application of game design principles and mechanics to application design. Gamification of an application can be used to drive participation and engagement by users of an application. In the business context, gamification can be used to motivate greater work participation and increase worker efficiencies to the organization.

The embodiments of the invention can be used to create gamification for any application, which includes any event or activity. In some approaches, the invention is applied to provide gamification such that an application is not modified to include the game features. Instead, an external gamification mechanism is provided to include the game features, where the external gamification mechanism is used in conjunction with the activity/application. In this way the invention is applicable to any activity and application, without requiring costly retro-fitting to include the game features. Moreover, this allows the invention to be applied to an activity and application where it would be difficult, expensive, or impractical to modify to include the game features.

Figure 1A:
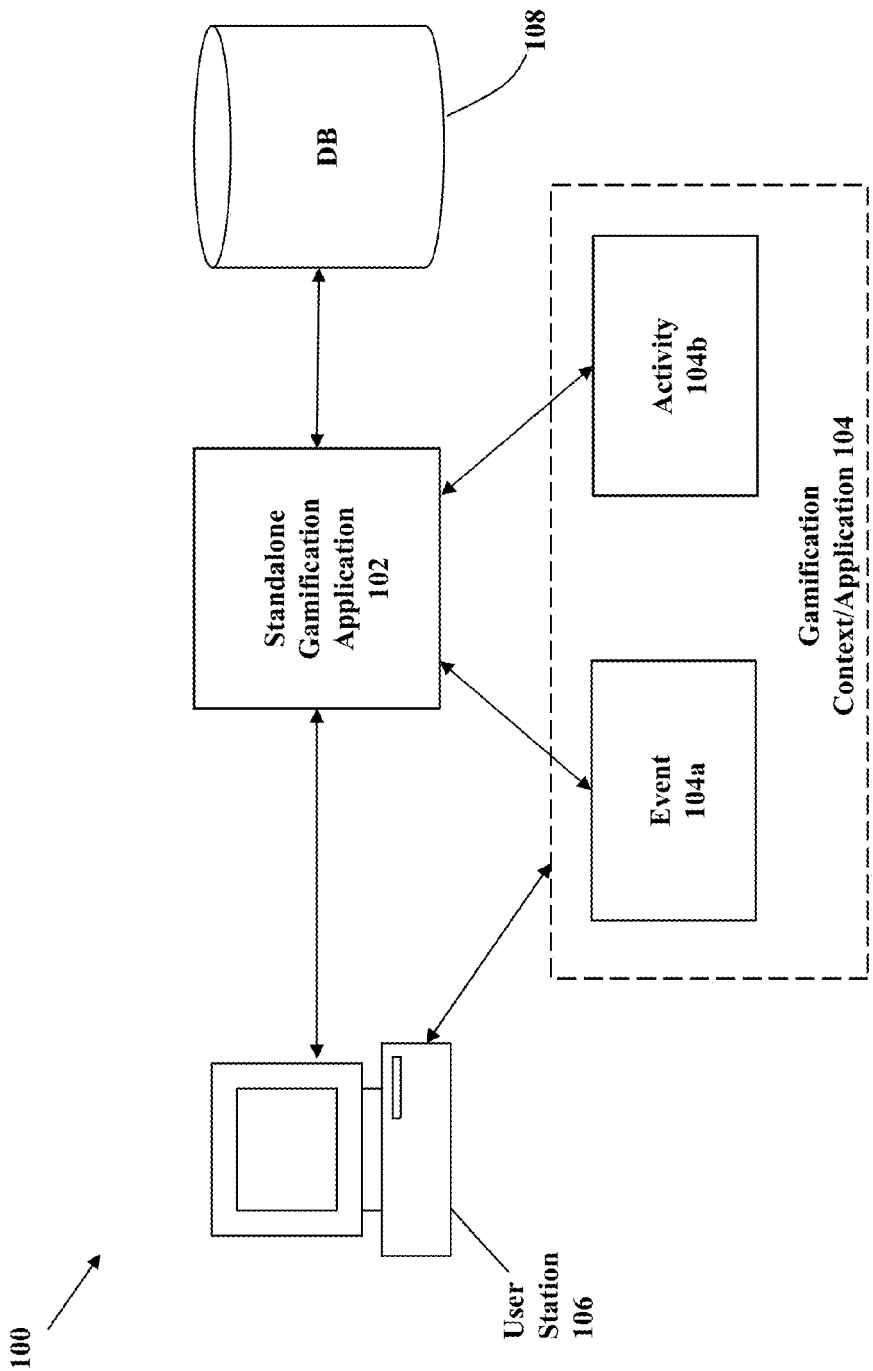
FIG. 1A illustrates a system for implementing gamification according to some embodiments of the invention.

FIG. 1A illustrates an example system 100 which may be employed in some embodiments of the invention to implement gamification. The system 100 includes one or more users at one or more user stations 106 that operate the system 100. The user station 106 comprises any type of computing station that may be used to operate or interface with the applications in the system. Examples of such user stations 106 include workstations, personal computers, remote computing terminals, tablets, and smartphones. The user station 106 comprises a display device, such as a display monitor, for displaying a user interface to users at the user station 106. The user station 106 also comprises one or more input devices for the user to provide operational control over the activities of the system, such as a mouse, touchscreen, or keyboard to manipulate a pointing object in a graphical user interface to generate user inputs.

The system 100 operates in conjunction with one or more gamification contexts/applications 104. These refer to any scenario or situation in which it is desirable to apply gamification concepts. Such contexts/applications 104 include, for example, a business context in which there is a desire to motivate and inspire employees to perform their employment duties. Context 104 may also pertain to an educational context, where there is a desire to motivate students or trainees in their educational activities. Context 104 may also refer to any commercial context (such as online activities) where there is a desire to motivate customer and/or users to perform certain actions of benefit to a given commercial entity. The context/application 104 may also pertain to a software application for which it is not desired to modify the software to specifically include gamification features.

In any of these contexts 104, there may be some type of event 104a and/or activity 104b for which it is desirable to improve with gamification concepts. In the business context, there may be a business flow or activity that can be improved with gamification mechanisms. For example, a software development company may seek to use gamification concepts to improve the process of developing software, e.g., by creating motivations to incentivize developers to accomplish developments goals faster and/or with less errors. Similarly, in the educational context, the educational entity may seek to use game mechanisms to motivate students to reach certain educational goals. In the commercial context, the commercial entity may seek to use gamification concepts to drive customer engagements and interactions. In a social context, any contest, event, or activity may be tracked and/or gamified using a gamification application. For the context of a software application, any feature, functionality, or overall usage of the application may be suitable for gamification.

Regardless of a specific context, it is noted that the invention is particularly well suited to gamify an event or contest. Any event or contest pertaining to any human activity can be gamified using embodiments of the invention.

In some embodiments of the invention, the application 104a and/or activity 104b are not themselves modified/customized to include the gamification features. Instead, an external standalone gamification application 102 is provided to implement the desired game features. The standalone gamification application 102 is used in conjunction with the event 104a and/or activity 104b to provide game features that is accessible by the users of the event 104a and/or activity 104b. The data operated upon by the standalone gamification application 102 may be stored in a computer readable storage device, e.g., in a database on the computer readable storage device 108. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented with persistent and/or non-persistent storage.

In general, the way the invention works is by configuring the standalone gamification application 102 to include game mechanics that further the goals of the gamification context 104. For example, in the educational context, scoring mechanisms and/or badges can be created and configured using the standalone gamification application 102, which are earned by students as they accomplish certain education tasks or reach certain educational milestones. Scoreboards can be maintained that track the accomplishments of students. By maintaining a game environment that has a system of rewards and competition associated with educational goals, the standalone gamification application 102 creates an enjoyable atmosphere that is more likely to motivate the students to accomplish their educational goals. In a similar way, this game environment is more likely to motivate employees to accomplish workplace goals. The game features can be administered to track gamification for any event or activity.

Gamification of an application can be used to increase engagement and participation for group or individual activities. Participants gain points and badges by completing tasks determined by the application administrator. Users log into a simplified application experience and to train themselves in understanding gamification mechanisms and to then design an implementable gamified flow.

The application provides functionality for the user to run own online training events, giving them a usable administrator interface to set up events and monitor them, and a dashboard, info board, and leaderboard. By using this application, the learning process itself is gamified.

Any offline or online event or contest can be gamified using embodiments of the invention. For example, consider a children's contest that is wholly conducted using offline activities that do not involve a computer, e.g., a contest at a children's party involving physical activity (such as running, playing, throwing, etc.). The standalone gamification application can be used to implement gamification features for that offline physical activity and to therefore very efficiently and excitingly implement/track that contest using the inherent gamification features administered by the gamification application, e.g., by implementing leaderboards for the teams and participants of the contest, and by assigning and tracking scoring and/or badges for the teams/participants. Any contest or activity that wholly or partially includes online activities can similarly be gamified using the standalone gamification application.

Figure 1B:
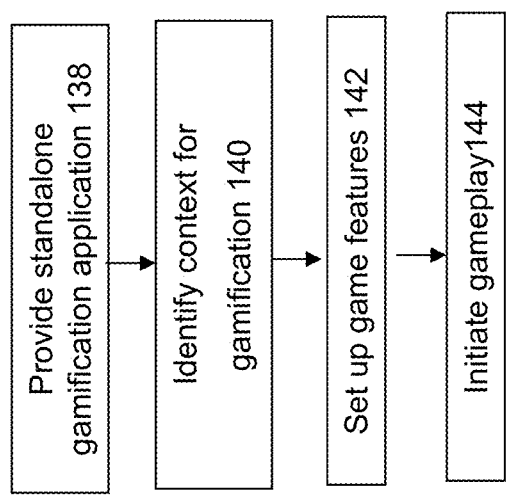
FIGS. 1B-D illustrate flowcharts of approaches to implement gamification according to some embodiments of the invention.

FIG. 1B shows a process for implementing gamification for an application or activity according to some embodiments of the invention. At 138, a standalone gamification application is provided. The standalone gamification application comprises game features and mechanisms that are configurable by an administrator.

Next, at 140, a context is identified for gamification. The identified context may generally address any application, activity or flow, such as an educational, business, or commercial flow.

At 142, an administrator sets up games features of the gamification application to address the identified context. In some embodiment, the gamification application comprises a user-friendly administration interface to allow administrators to create events, add teams and individuals, avatars or images for users. Wizard/guided approaches may be employed, e.g., using wizard/guided process and UI (user interface) pages to enter task flows, user flows, and/or other metadata. In addition, a wizard designed approach can be taken to prompt game mechanics and components for the flow.

Any suitable approach can be used to configure and upload users and flows, and to assign to events, teams and/or individuals. For example, information about users for the application can be uploaded in some embodiments by using data formats such as the csv (comma separated value) and/or xml (extensible markup language) formats.

Many gamification features can be provided and/or configured using the gamification application. For example, a leaderboard and/or infoboard can be provided to show real-time updates for team status to create excitement and competition. Badges may be created to be awarded to users as they achieve certain goals and accomplishments. In some embodiments, administrators may add product or event-specific badges.

A library of game mechanics and associated application development components can be provided for administers to pick from, e.g., implemented with development components pertaining to the Application Development Framework (ADF) available from Oracle Corporation. The library may include examples of gamified flows to learn from. The library may also include patterns of game mechanics. In some embodiments, finished flows may be transferred and downloaded to development environments, e.g., the JDeveloper integrated development environment (IDE) available from Oracle Corporation, or other IDE user for coding. In some embodiments, the application provides the ability to review and share wireframe online, annotate.

The application in some embodiments provides a solution to implement export and publishing of gamification data (e.g., badges) outside of app and use them in other apps and on web. Text is exportable in any suitable format, e.g., XML or XLIFF (XML Localization Interchange File Format). Badges may be exported in any suitable format, e.g., SVG (scalable vector graphics) or PNG (portable network graphics).

In some embodiment, administrators and/or users have the capability to write, review and proof any text written for badges, notifications. Version control can also be provided for gamified flows. In addition, wireframes are viewable online.

Any type of data may be displayable by the gamification application. For example, multi-media files may be displayable through the application, providing support for multi-media files such as audio, .mov, or .avi files.

Collaboration features may be provided, e.g., to tweet, share, comment, rate designs, and forums integration to discuss. Data archive and backup capabilities are also provided to the administrator for the gamification application.

Customizable, transparent point scoring and badging awards system can be implemented by a rules engine. In a business or enterprise context, a business rules engine allows administrators to set their own rules and awards in the system to support their unique business goals. This is implemented by creating a rulebase having the appropriate rules that create incentives for users to achieve milestones and accomplishments that further the business goals. The rulebase is applied by a rules engine to update and maintain the scoring of points and awarding of badges. Similar rules may be used to facilitate goals in other contexts, e.g., by using educational rules to further educational goals.

At 144, gameplay can then be initiated for the application/activity using the standalone gamification application.

Figure 1C:
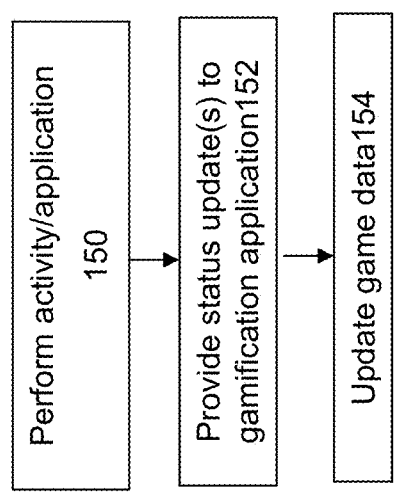

FIG. 1C shows a flowchart of an approach to update information for the gamification application. At 150, actions are performed by users of the activity and/or application. For example, in the educational context, students may perform certain education-related tasks such as taking a test, studying coursework, or performing a project. The actions may be taken within the structure of the gamification application. The actions may also be taken independent of the standalone gamification application.

At 152, information about the actions is provided to the gamification application. In some embodiments, this transfer of information is performed electronically, e.g., where an educational data management application sends data about student accomplishments to the gamification application. Alternatively, such information may be provided manually, e.g., by having a user log into the gamification application to provide status updates or to perform actions to create the status updates.

At 154, gameplay data maintained by the gamification application is updated in response to status updates. For example, scoring may be updated or badges awarded as a result of the actions taken by the users. In addition, team statistics or scoring may be adjusted based upon status changes by one or more members of the team. Leaderboards and/or infoboards may also be updated as a result of any status changes.

Figure 1D:
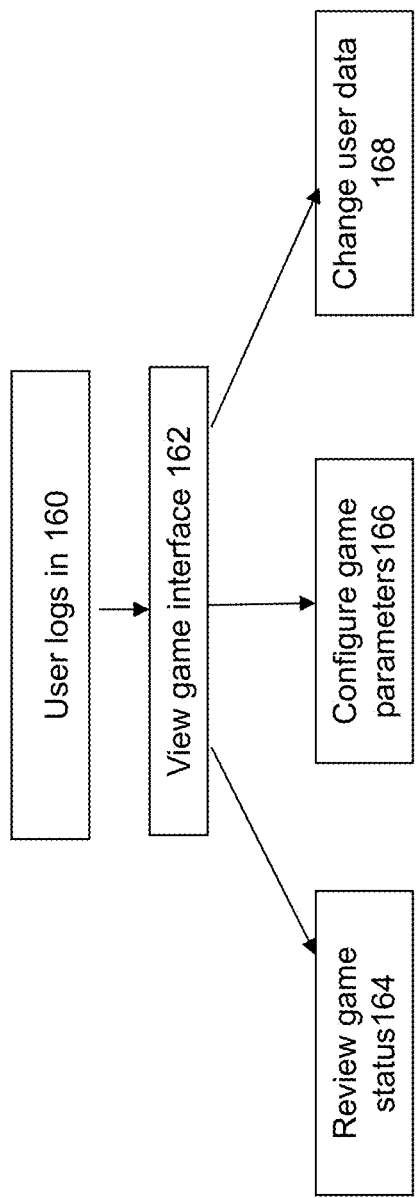

FIG. 1D shows a flowchart of user interactions that take place with some embodiments of the gamification application. At 160, the user logs into the gamification application. A secure login is provided to ensure that only authorized individuals are permitted to access the system.

At 162, a user interface is provided to the user of the gamification application. More details of example interface screen are provided below in this document. In some embodiments, a responsive design display is provided for any suitable medium, including for example, web, tablet, mobile and game console, video, and kiosk display. Auto generation may be performed of gamified wireframe online, annotated with component names (e.g., for ADF components).

Using the interface, at 164, the user may review game status information. The information may pertain specifically to the user, e.g., for scoring or badges earned by the user himself/herself. The information may also pertain to status information for any teams associated with the user. In addition, the user may use the interface to view general information about the game status, such as leaderboards or infoboards.

At 166, the user may configure one or more game parameters. For example, in some embodiments, the user may have requisite authorization to create new/custom badges and/or to edit existing badges in the system.

At 168, the user may edit user information in the gamification application. During initial log-ins, such information may include set-up information for the user. For example, for a given business process, the level of expertise may be selected to be associated with the user. This information may be used, for example, to allow a business rules engine to assign points and badges that are appropriate for that selected level of expertise. In addition, after gameplay has begun, the user may have the authorization to unlock badges and points themselves.

The interface may also include interactions with the user to promote goals of the gameplay. For example, in the educational setting, the interface may include online tests that scores users on certain defined sets of knowledge.

In some embodiment, the standalone gamification application can be configured to provide branding/skinning capability to customize to the brand of a given organization.

Figure 2A:
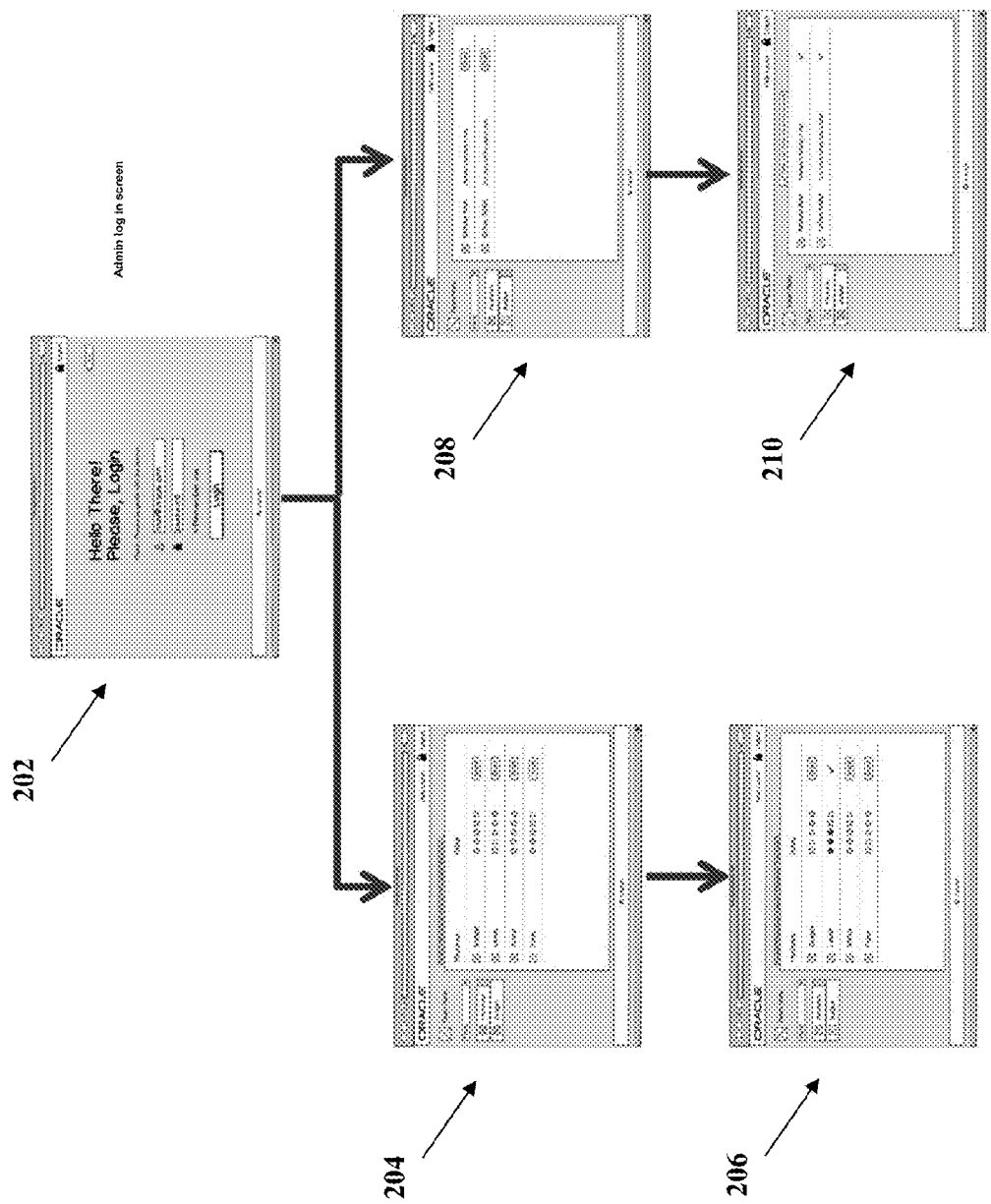
FIGS. 2A-F illustrate an example set of administrator interface views for the gamification application.
Figure 2B:
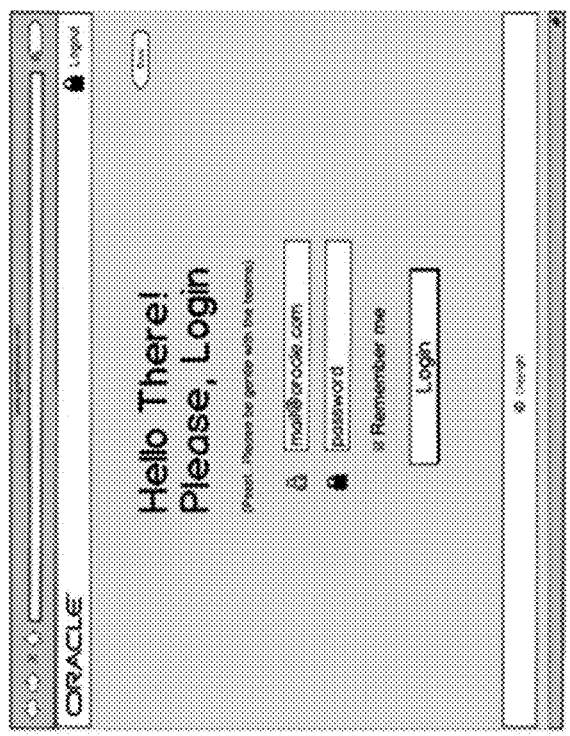

FIGS. 2A-F illustrate an example set of administrator interface views for the gamification application. As shown in FIG. 2B, interface 202 illustrates an example login screen for an administrator of the gamification application. In some embodiments, only the administrator has privileges to configure certain aspects of the gamification application, such as the list of users, team configurations, and game mechanics for the flow.

Figure 2C:
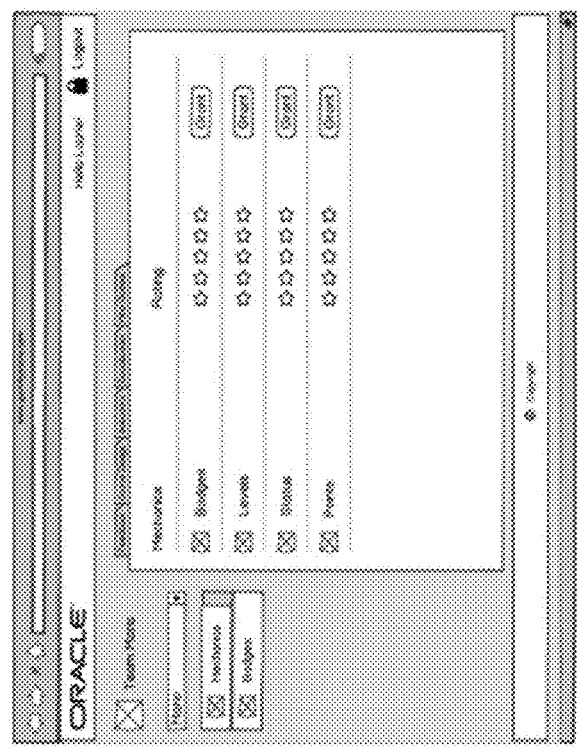

As shown in FIG. 2C, interface 204 provides a view of teams that can be scored. This is assigned, for example, using a drop-down menu (as shown on left side of the interface). Features of game mechanics can be selected for the team using this interface. For example, badges, scoring, levels, and status settings can be configured using the interface, e.g., with the mechanisms shown on the right side of the interface. A visual focus can be placed on tabs within the interface to implement the administrator's control of the settings.

Figure 2D:
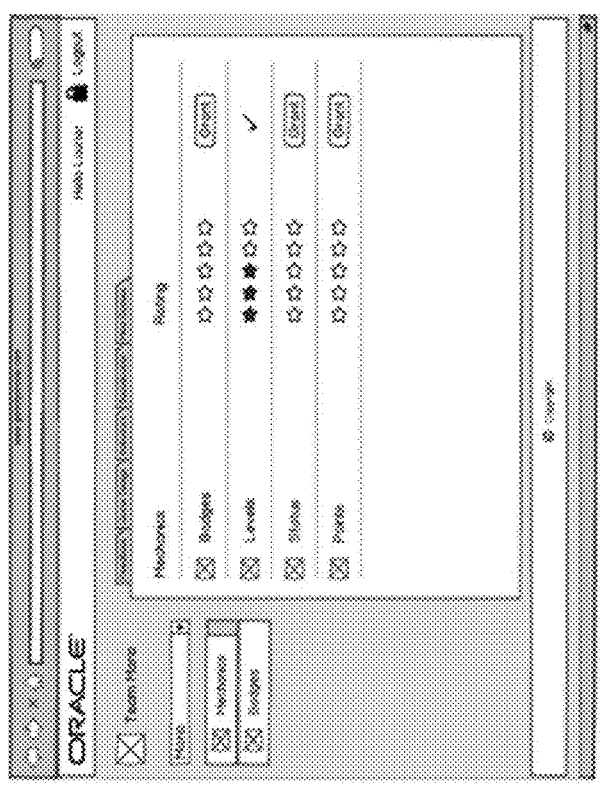

As shown in FIG. 2D, interface 206 can be used to provide star ratings. The star ratings correspond to points that can be obtained by the specified team. The value for the points can be determined in any suitable way, e.g., by using a business rules engine where one or more rules are configured to determine the point values. In some embodiments, the default is to have one point per star, which may be changed by the interface.

Figure 2E:
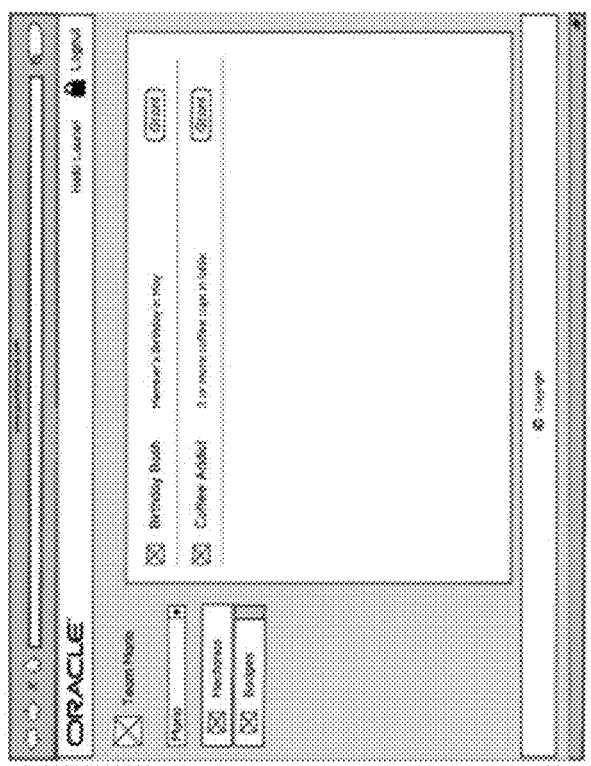
Figure 2F:
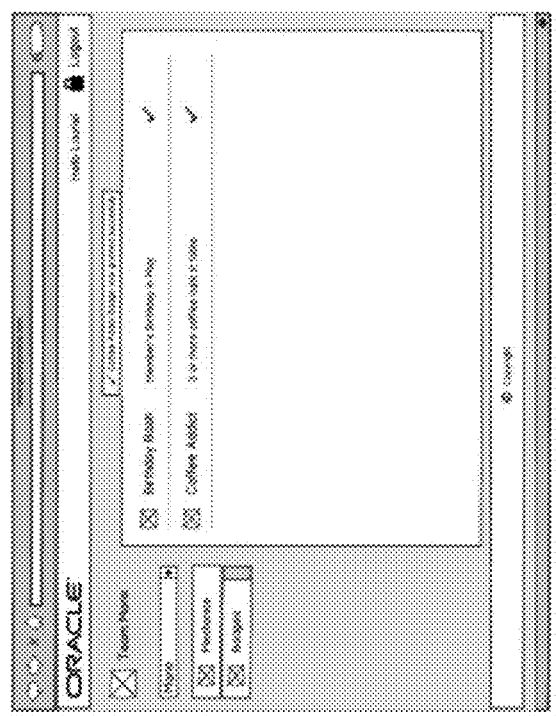

As shown in FIG. 2E, interface 208 can be used to display badges and rules that may be used/configured to grant the badges. The administrator selects the "grant" button to grant the badge/rule. As shown in FIG. 2E, when the "grant" button has been checked, then the interface 210 will no longer allow the granted badge to be clickable in the interface.

Figure 3A:
FIG. 3A illustrates an infoboard that shows real-time updates for teams, along with badges for activities.
Figure 3B:
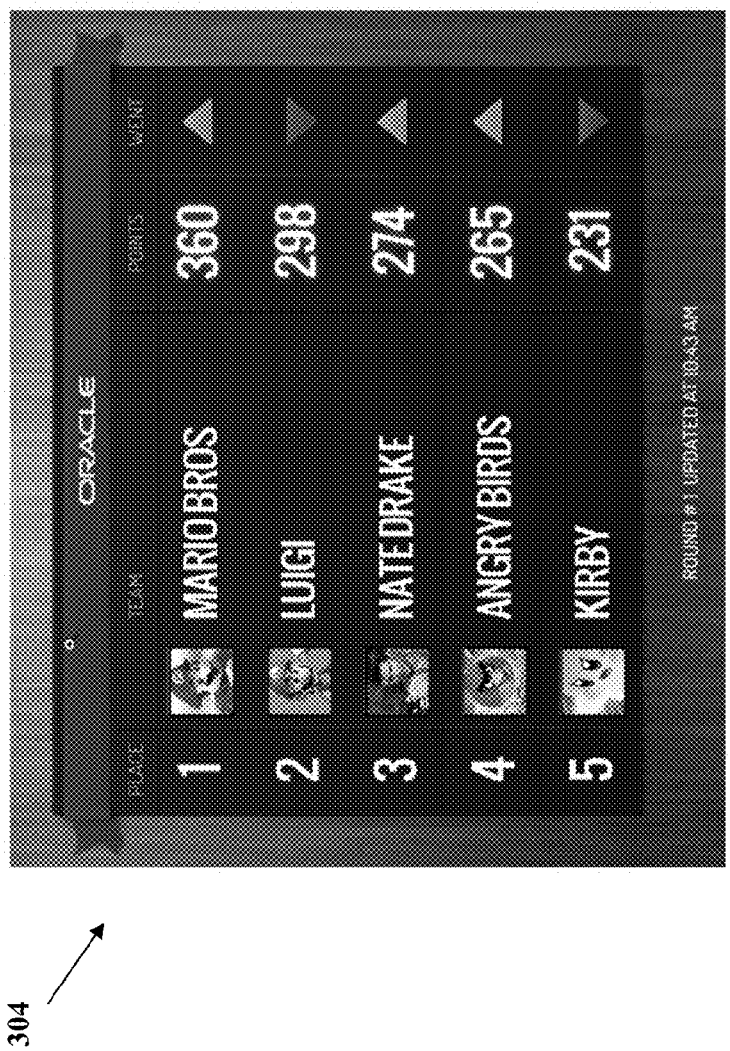
FIG. 3B illustrates an example leaderboard with real-time updates for all teams' earned points, along with directions arrows showing movement in rankings.

FIG. 3A illustrates an infoboard 302 that shows real-time updates for teams, along with badges for activities. FIG. 3B illustrates an example leaderboard 304 with real-time updates for all teams' earned points, along with directions arrows showing movement in rankings.

Figure 4A:
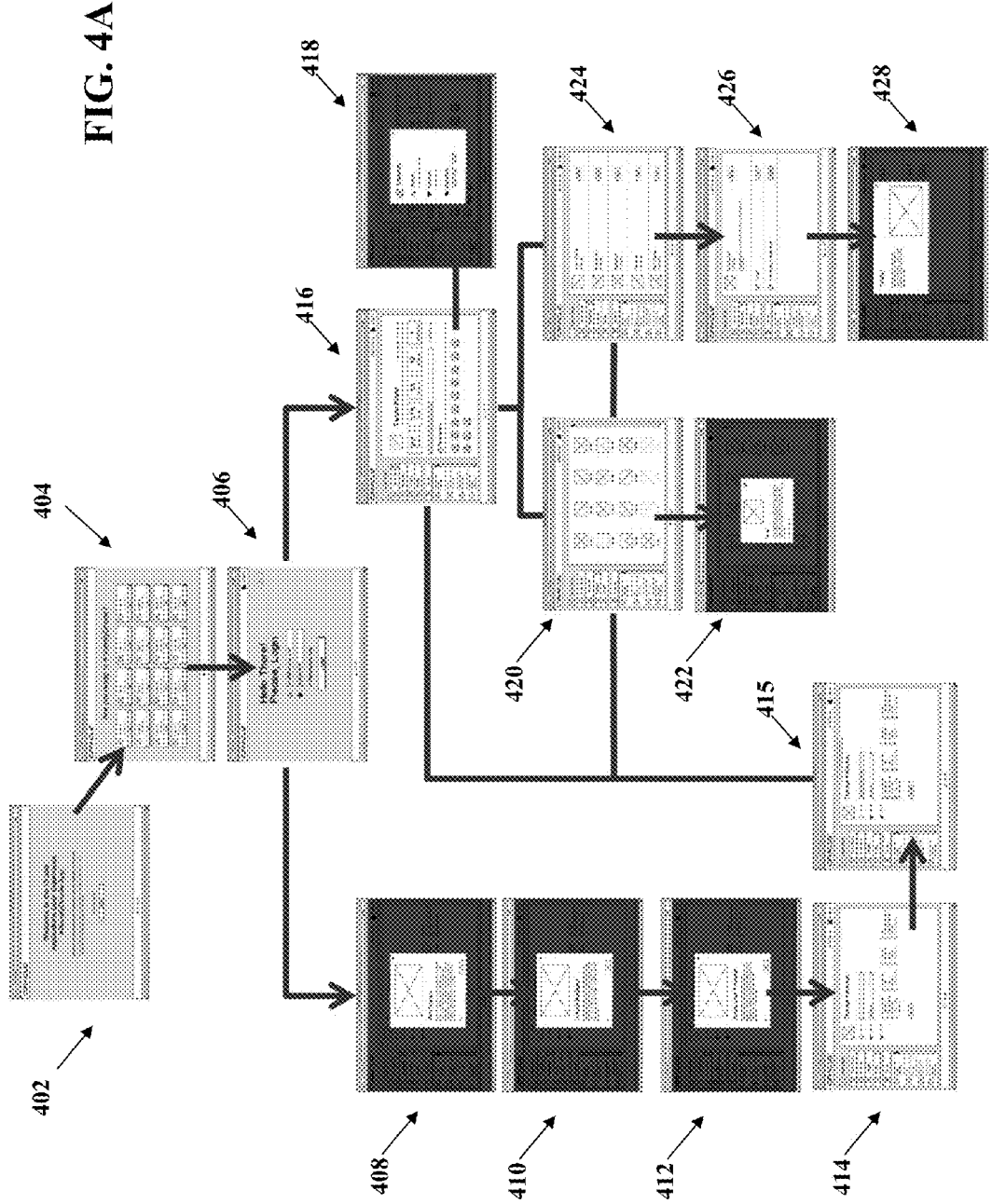
FIG. 4A-P illustrate a flow of the user interaction processing according to some embodiments.
Figure 4B:
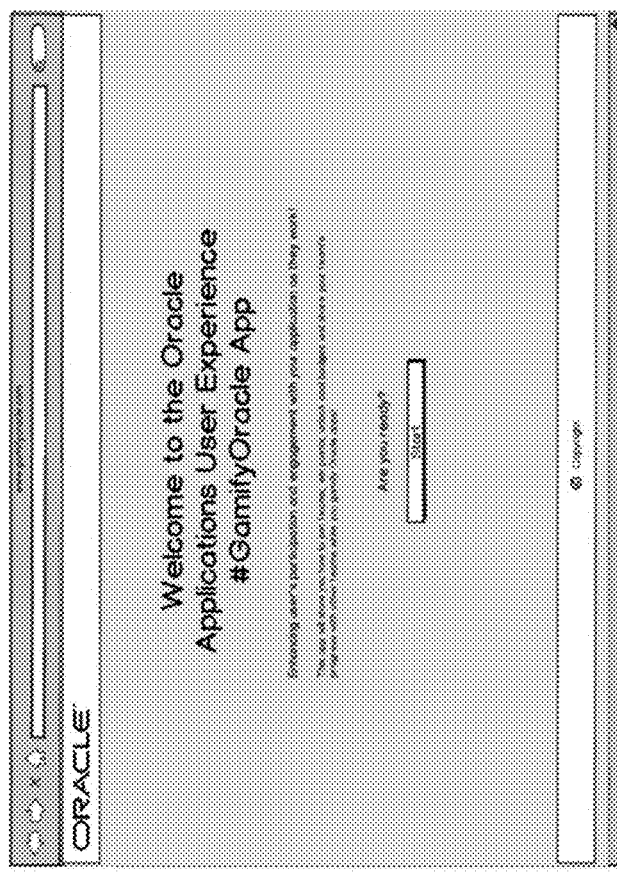
Figure 4C:
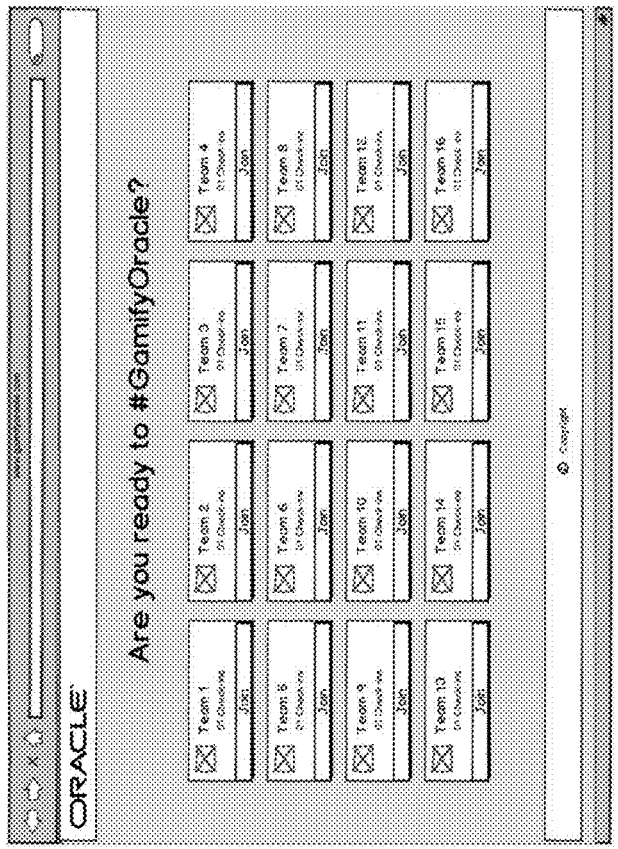
Figure 4D:
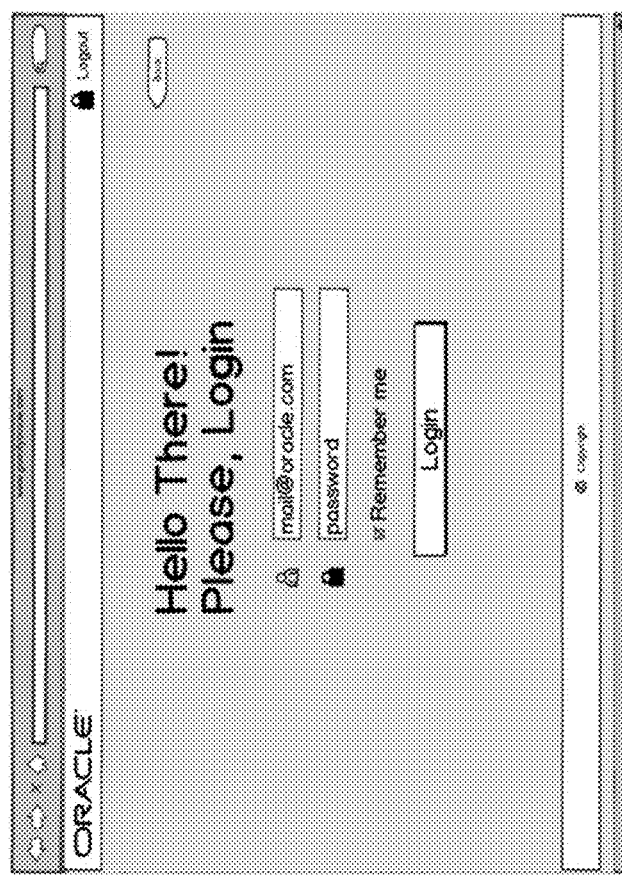
Figure 4E:
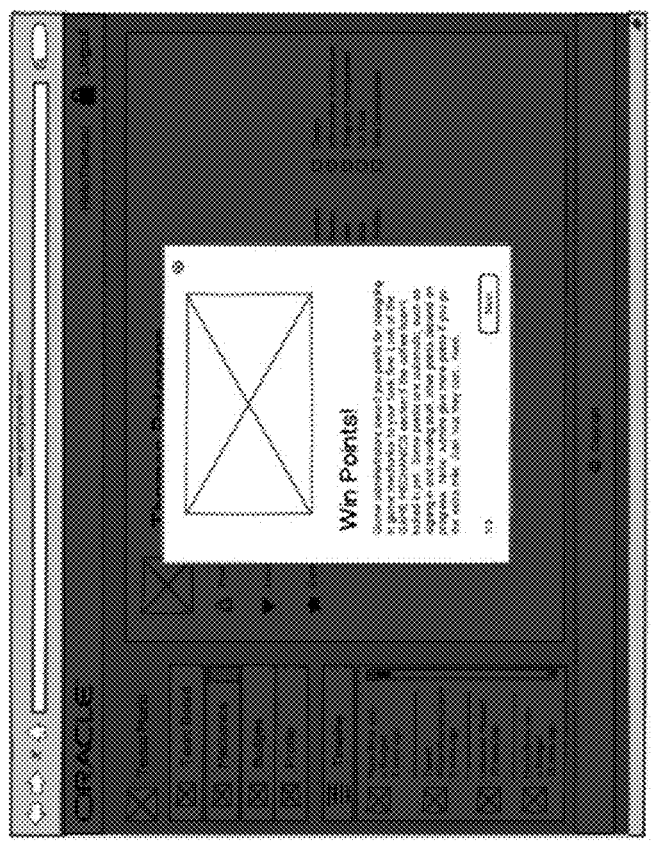
Figure 4F:
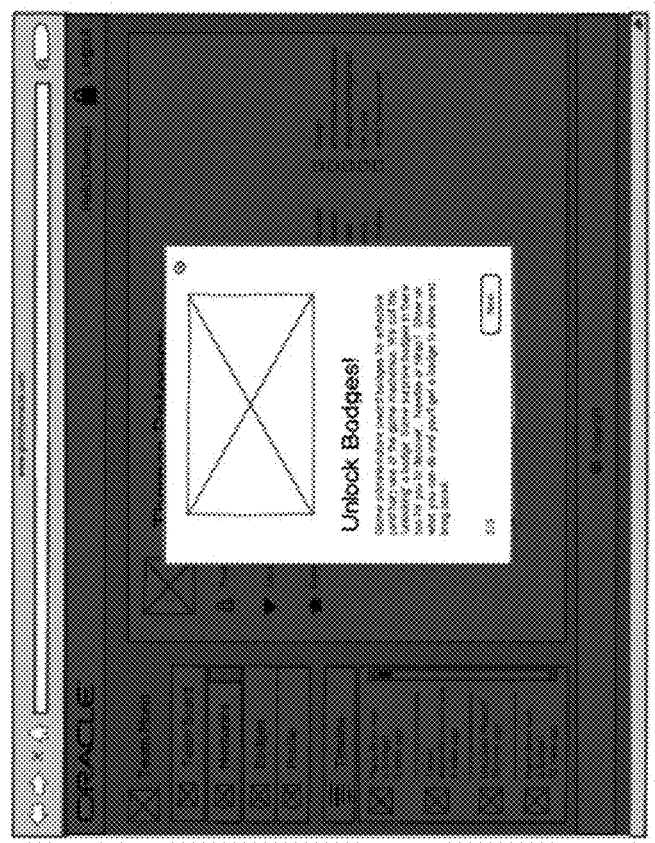
Figure 4G:
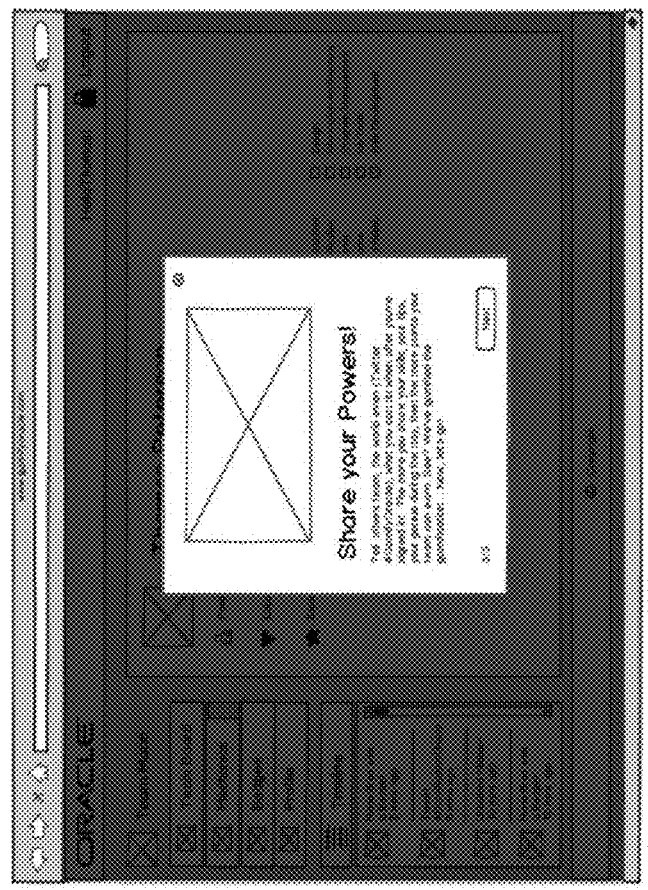
Figure 4H:
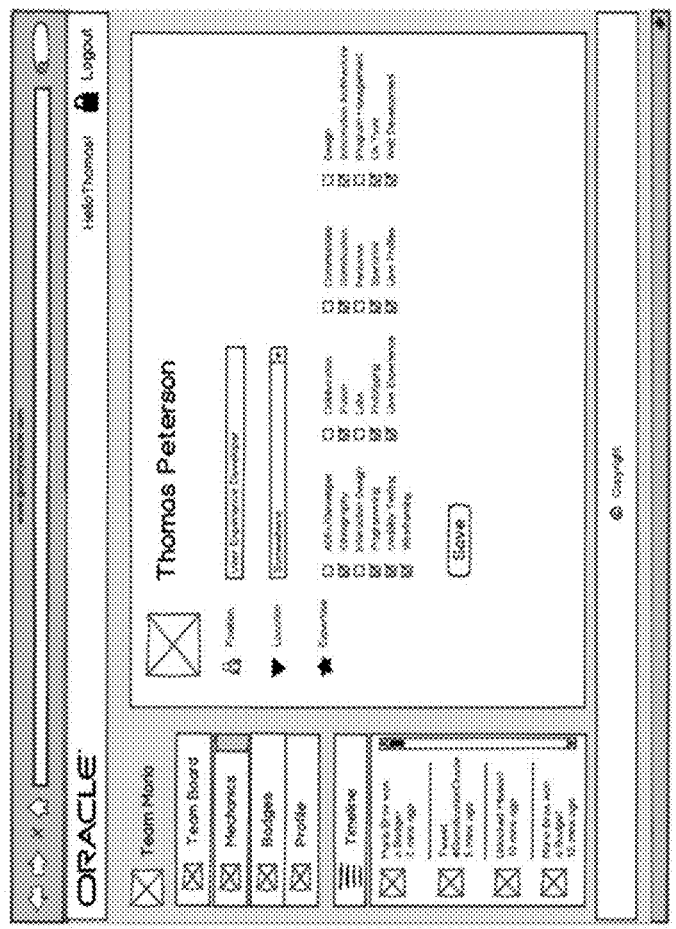
Figure 4I:
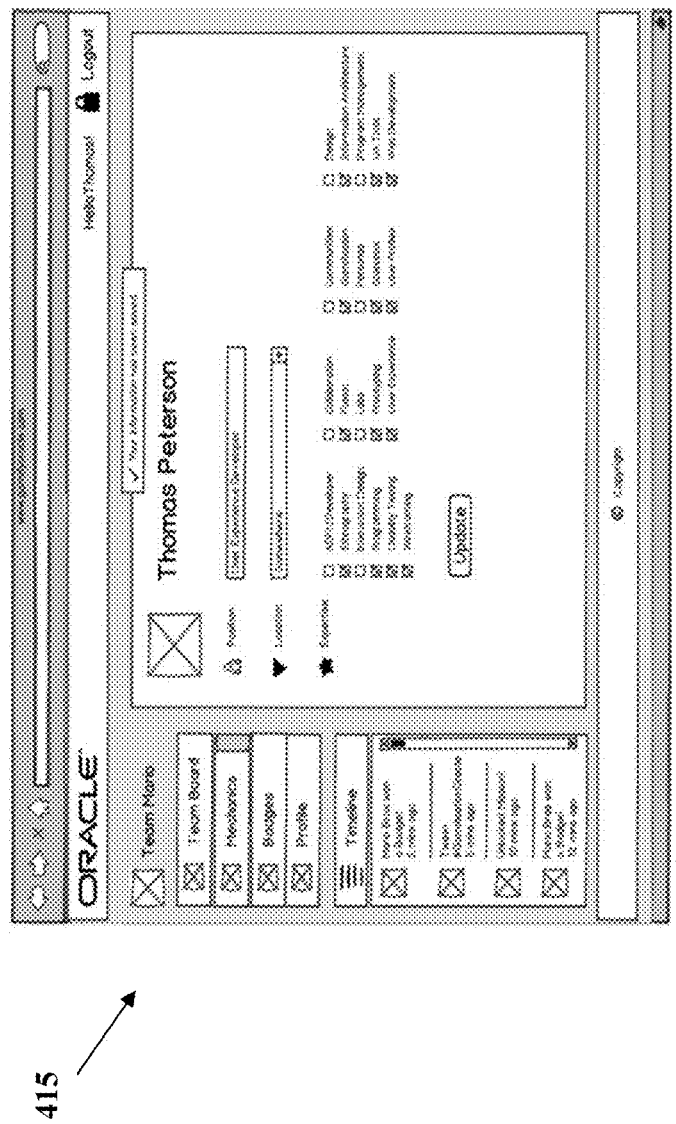
Figure 4J:
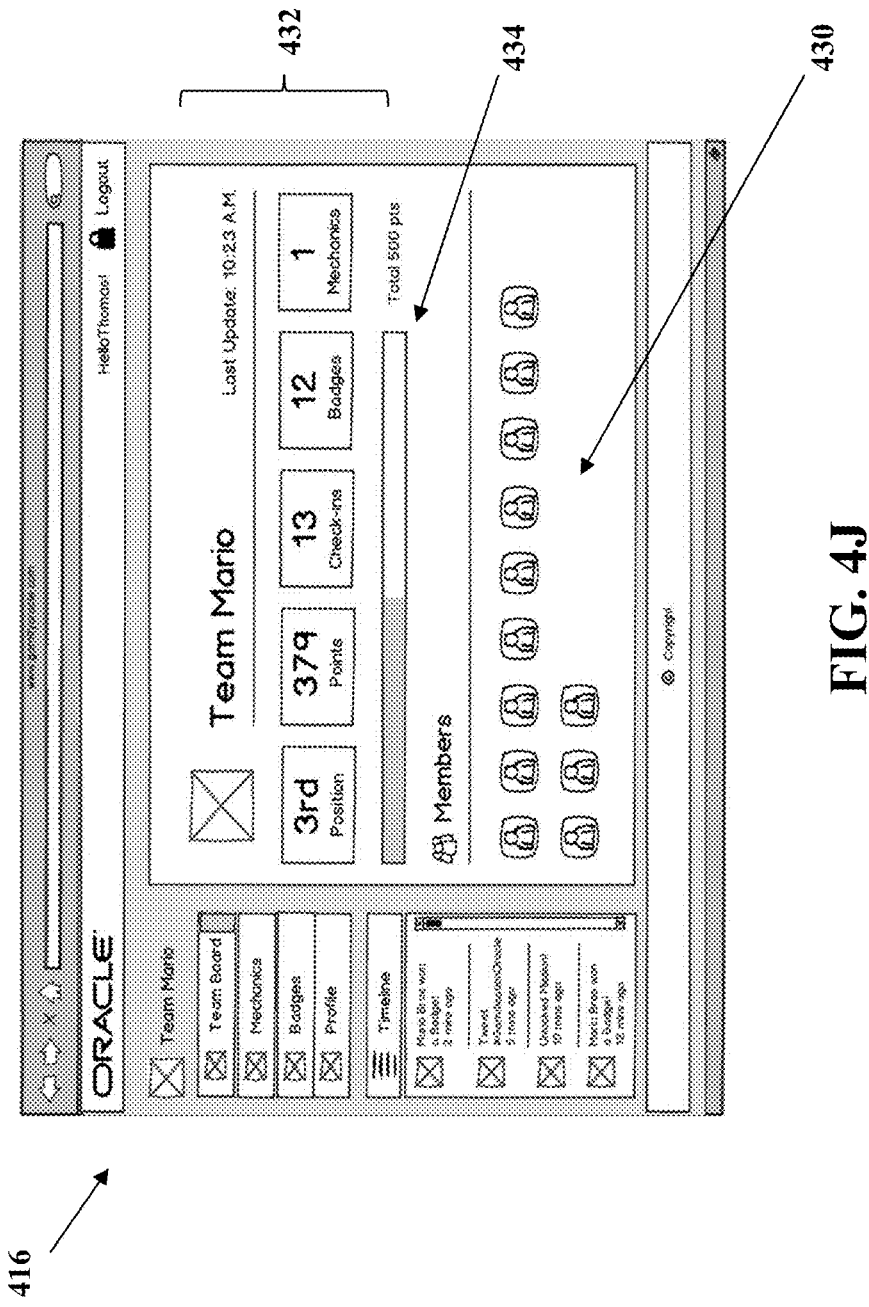
Figure 4K:
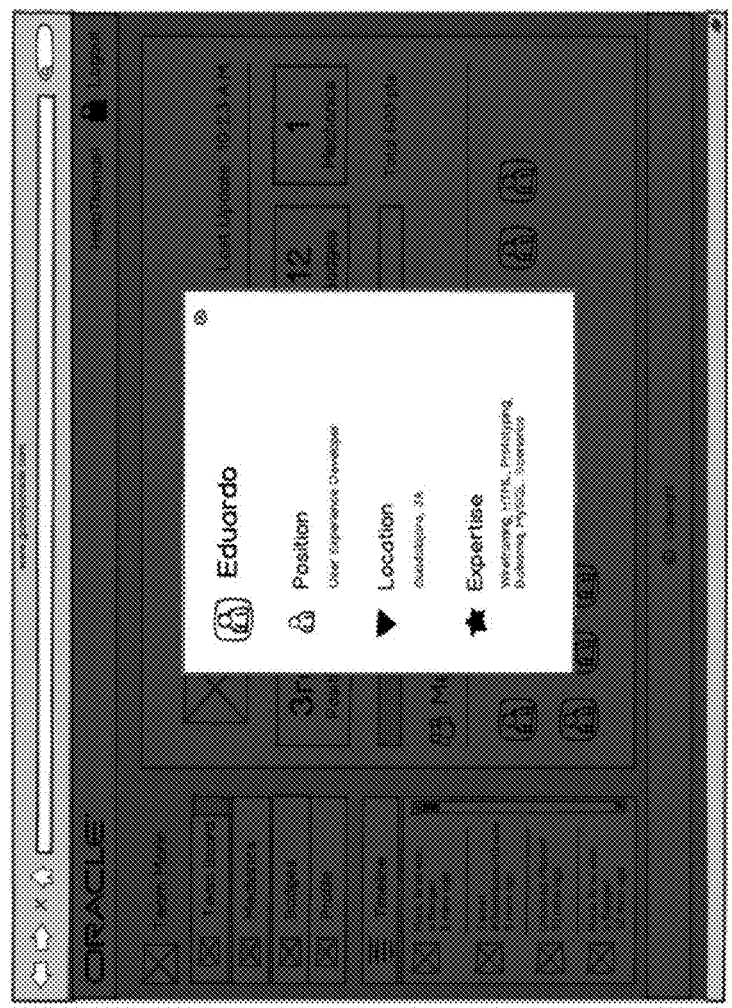
Figure 4L:
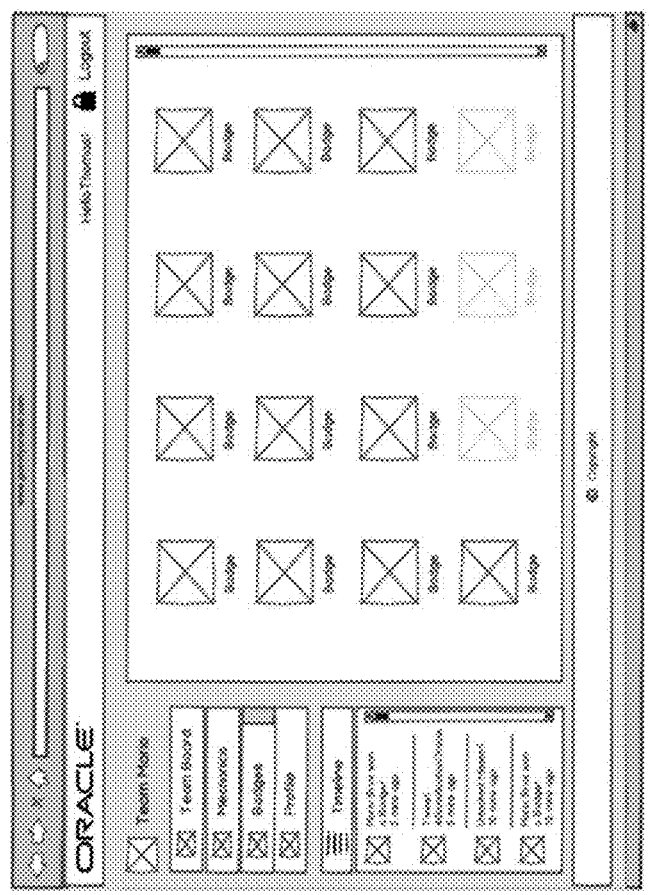
Figure 4M:
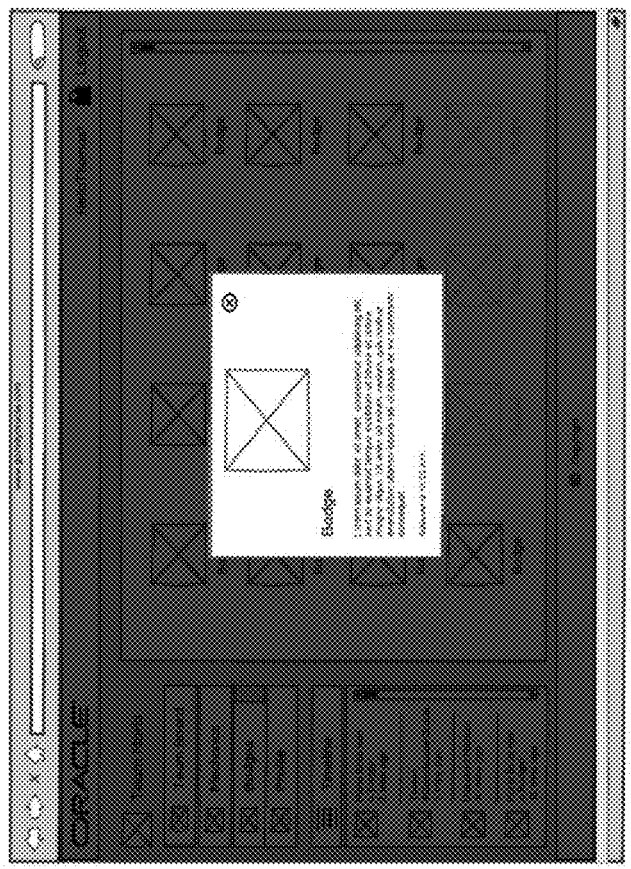
Figure 4N:
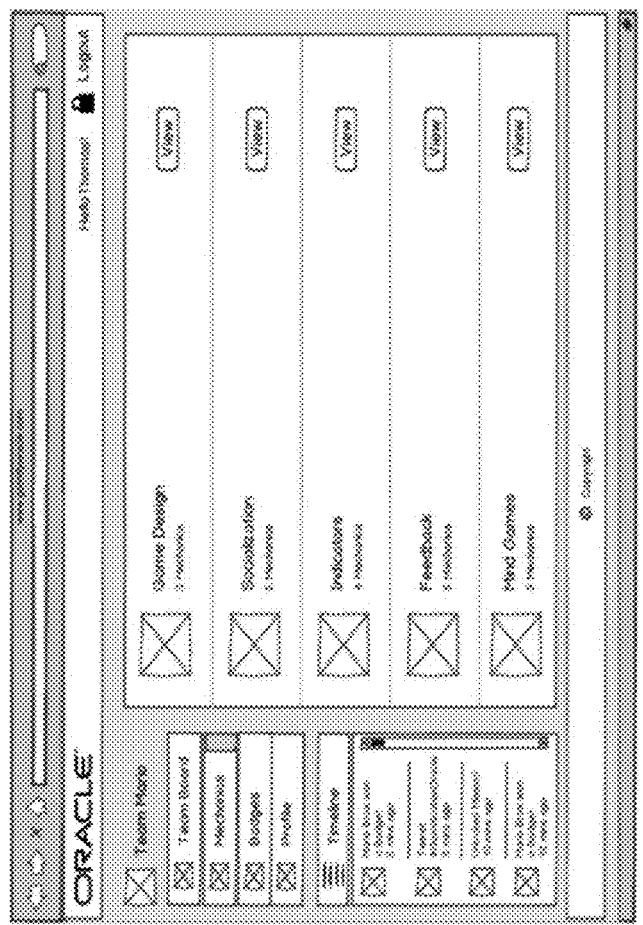
Figure 40:
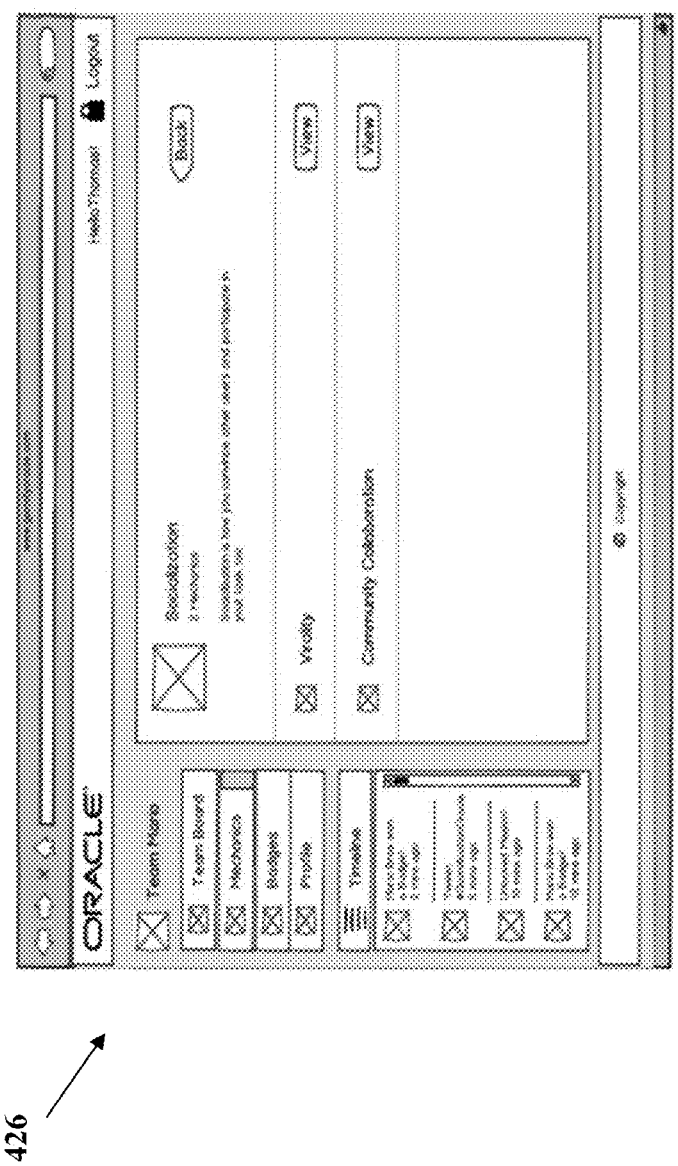
Figure 4P:
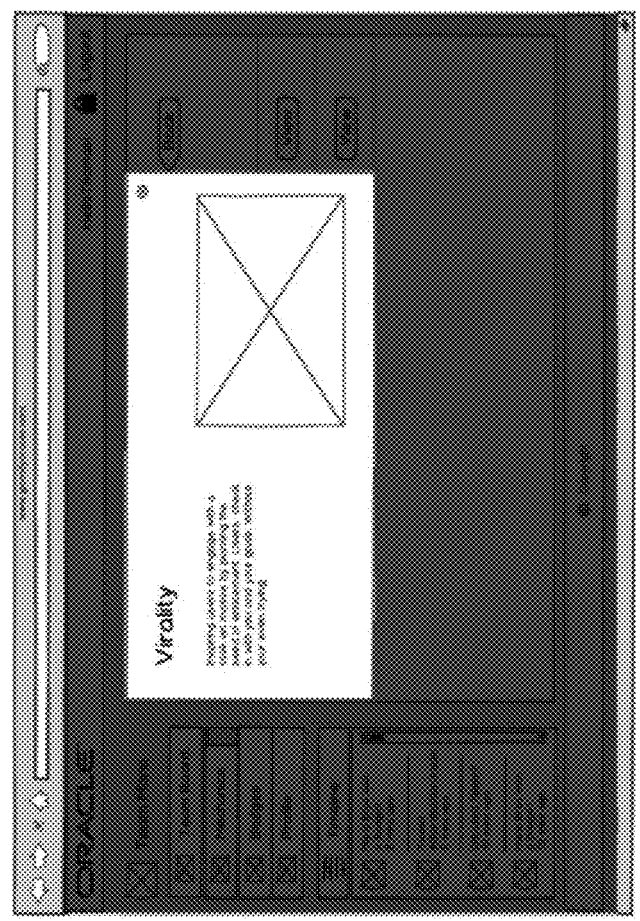

FIG. 4A-P illustrate a flow of the user interaction processing according to some embodiments. FIGS. 4B-D illustrate the log in process for the user interaction. Interface 402 of FIG. 4B shows an example of an initial welcome screen for the gamification application. Interface 404 of FIG. 4C illustrates an interface for allowing a user to log into the assigned team, e.g., by clicking onto the appropriate team button. Interface 406 of FIG. 4D illustrates an example log-in screen or the user.

FIGS. 4E-I illustrate interfaces for a first-time login flow. Interface 408 of FIG. 4E shows an example screen for describing how points can be obtained by the user. Interface 410 of FIG. 4F shows an example screen for describing how badges can be unlocked by the user. Interface 412 of FIG. 4G shows an example screen for describing how powers obtained by the user can be shared.

Interface 414 of FIG. 4H illustrates an interface that can be used, during the first time login, for having the user selecting certain information and settings. For example, the user can select a given expertise, and the system (e.g., a business rules engine) can be used to assign points/badges based on the chosen expertise. Saving the settings results in the updateable profile page for the user as shown in the interface 415 of FIG. 4I.

Interface 416 of FIG. 4J shows an example team page. The team page shows a list 430 of members and a running real-time ticker 432 of badges and points earned by the team. A progress bar 434 may be displayed that shows the current progress of the team towards a designated goal.

It is noted that a tab shown in whole page is always given visual focus in some embodiments.

Upon selection of an individual team member within interface e 416, a profile view can be shown of the individual team member's profile, e.g., as shown in Interface 418 of FIG. 4K. The profile view may include any suitable information about the team member. Examples of such displayed information include the team member's position/title, location, and/or expertise.

Interface 420 of FIG. 4L illustrates an example badge page that shows all available badges. Different indicators can be used to show differences between the badges. For example, different colors can be used to distinguish earned badges from unearned badges. As shown in interface 422 of FIG. 4M, selection/clicking of a badge icon brings up another page about that badge, e.g., to show information on how the user/team earned the badge (if already earned) or how to earn the badge (if not already earned).

Interface 424 of FIG. 4N illustrates an example mechanics page that shows categories of game mechanics. As shown in interface 426 of FIG. 4O, each category can be selected to open up another page showing subcategories. The subcategories pertain to mechanism to earn points and/or badges within the greater groupings. As shown in interface 428 of FIG. 4P, a view can be opened to show definitions and/or examples.

Figure 5:
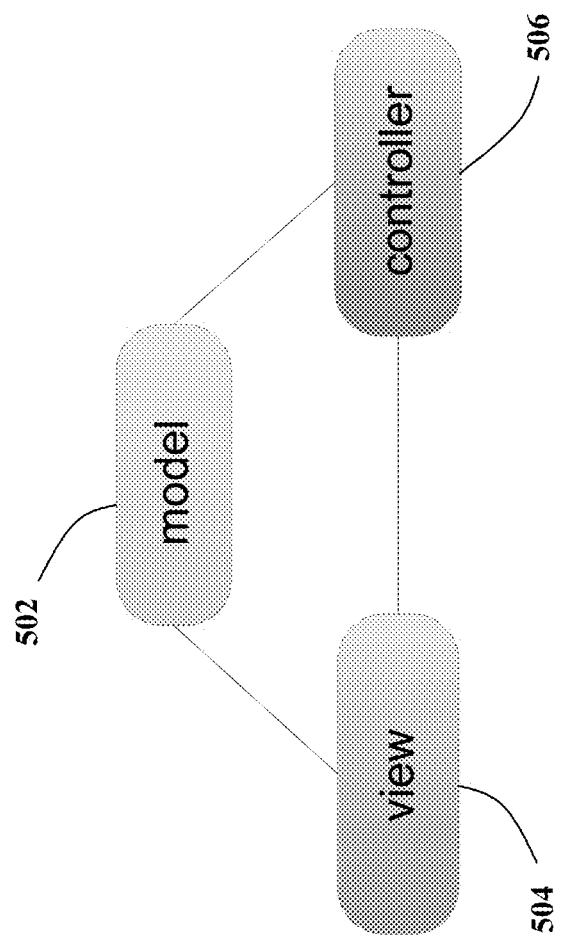
FIGS. 5-6 illustrate an architecture that can be used to implement some embodiments of the invention.
Figure 6:
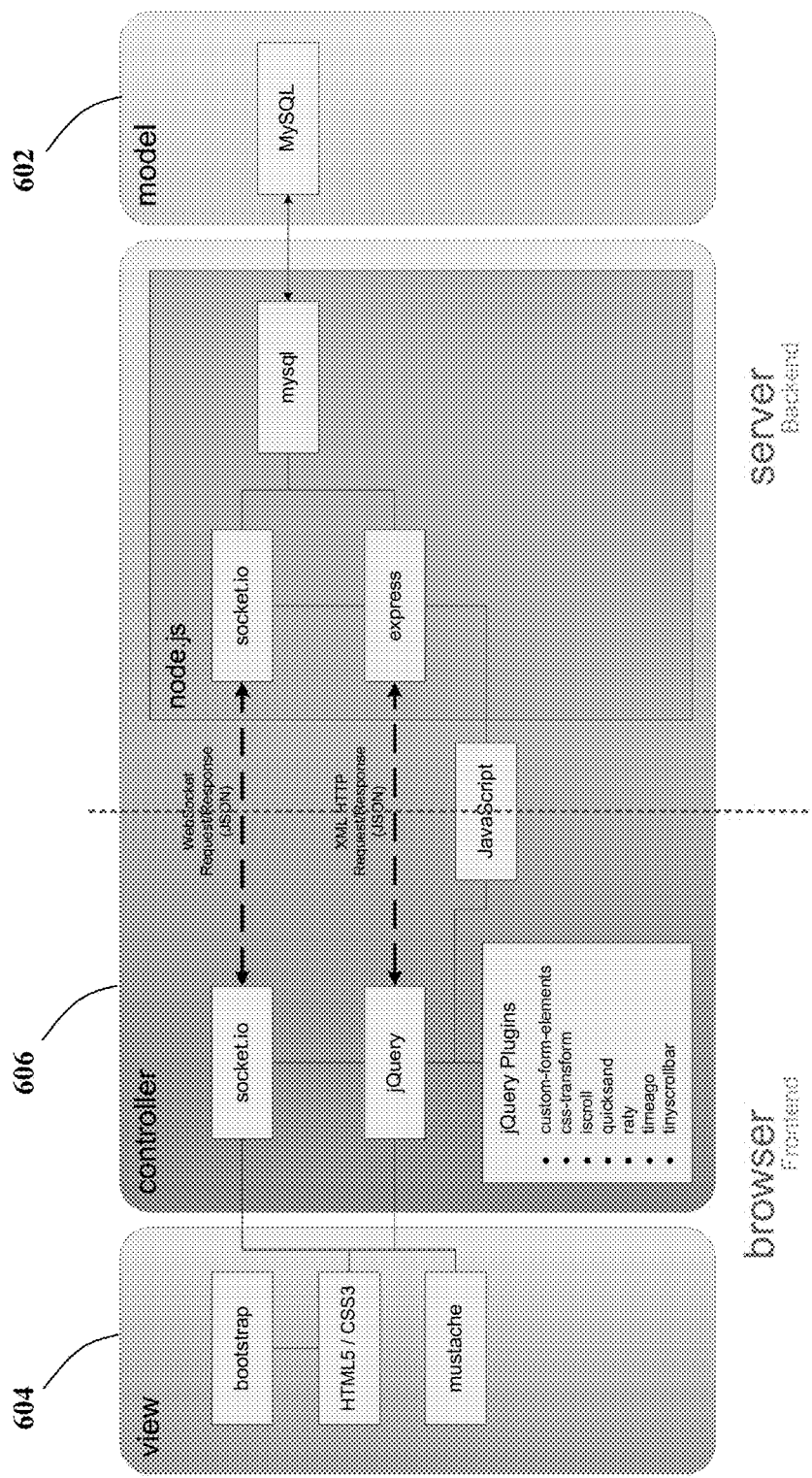

FIGS. 5-6 illustrate an architecture that can be used to implement some embodiments of the invention. In line with community best practices, the gamification application in some embodiments provides a clean separation of business logic, data and user interface. In other words, it implements a model-view-controller (MVC) architecture, e.g., as illustrated in FIG. 5.

In this MVC architecture, the model layer 502 represents the data values to be displayed within an application. The view layer 504 contains the user interface (UI) pages used to view or modify the data. The controller layer 506 processes data and encapsulates business logic.

FIG. 6 illustrates where each technology fits within the gamification application in the MVC architecture in the current embodiment. The model layer 602 may be implemented using any suitable component. For example, MySQL is an open source relational database management system (RDBMS) that can be used to persist the data for the gamification application.

The view layer 604 may be implemented for a browser front-end using a bootstrap component comprising a HTML (hypertext markup language), CSS (cascading style sheets), and/or JavaScript library which can be used to generate responsive user interfaces, e.g., user interfaces which adapt themselves to the device in which they are displayed. A templating library may be employed. In some embodiments, the "mustache" component is utilized, comprising a logic-less templating library available for multiple languages such as JavaScript, Java and scripting languages (e.g., PHP). Templating is useful to help separate the logic from the user interface.

To interface with the view layer 604, the controller layer 606 uses socket.io and jQuery. Socket.io is a JavaScript library for node.js which helps to establish websocket connections between the clients (browsers) and the node.js server. Websockets allow the Apps to be updated in real time. jQuery is a JavaScript library that helps to simplify HTML document traversing, event handling, animating, and AJAX interactions for web development.

On the server backend for the controller layer 606, Node.js can be employed. Node.js is a server built on Google Chrome's JavaScript runtime. This means this server allows the execution of JavaScript files. The "express" component can also be used, which is a web framework for node.js. This provides tooling for HTTP servers, e.g., for single page applications, web sites, hybrids, or public HTTP APIs.

Therefore, what has been described is an improved approach to implement gamification of applications and activities. The embodiments of the invention can be used to create gamification for any application/activity. In some approaches, the invention is applied to provide gamification such that an application is not modified to include the game features. Instead, an external stand-alone gamification mechanism is provided to include the game features, where the external gamification mechanism is used in conjunction with the activity/application. In this way the invention is applicable to any activity and application, without requiring costly retro-fitting to include the game features. Moreover, this allows the invention to be applied to an activity and application where it would be difficult, expensive, or impractical to modify to include the game features.

As a result, the invention greatly addresses the problems of motivations for individuals. For example in the enterprise context, employee engagement continues to be a major issue to industry that can be addressed with the invention. Instead of having bored or disengaged employees that represent a huge productivity cost to companies and organizations, the gamification application creates motivated and incentivized employees, where the game mechanisms are tailored using business rules to address desired business flow. These same mechanisms can be used to provide motivation in any context, such as motivating students in an educational context.

System Architecture Overview

Figure 7:
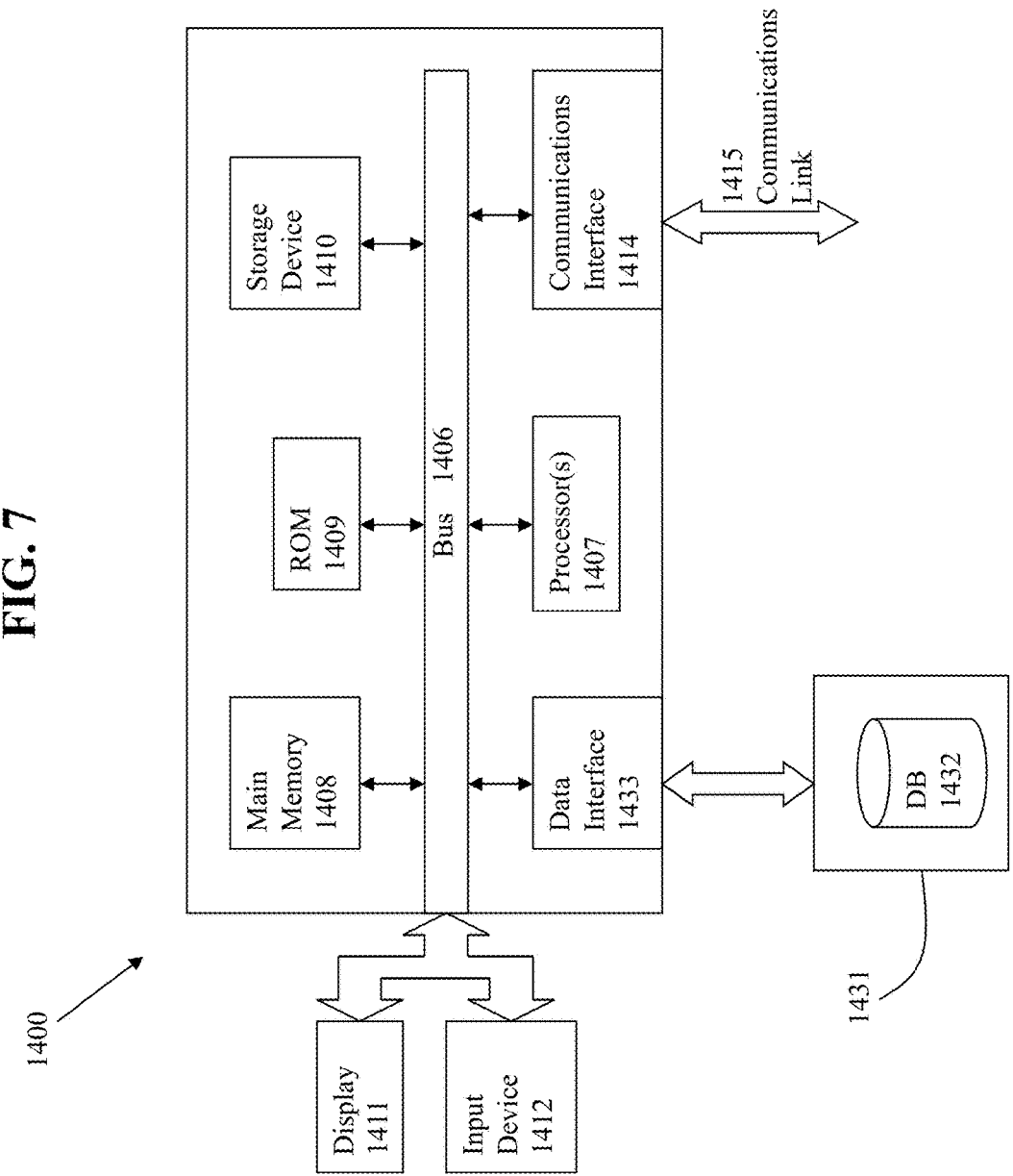
FIG. 7 is a block diagram of an illustrative computing system 1400 suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data within a database 1432 may be accessed on a compute readable medium 1431 using a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
   identifying a software application to gamify, the software application being associated with a first computing device;

providing a gamification application that is external to the software application, the gamification application being associated with a second computing device, the gamification application implementing one or more game features for the software application without modifying the software application, wherein the one or more game features are implemented by:
  identifying an event or activity corresponding to the software application to implement with the one or more game features,
  associating the event or activity corresponding to the software application with at least one game mechanic corresponding to the one or more game features from a library of game mechanics stored at the gamification application, the gamification application comprising websocket connections between the gamification application and the software application that transfer data associated with the event or activity corresponding to the software application to be updated in real-time at the gamification application, and
  storing the data transferred from the software application to the gamification application in a database associated with the gamification application.

2. The method of claim 1, in which participants use the gamification application to gain points and badges by completing tasks with the software application.

3. The method of claim 1, in which a leaderboard or infoboard is provided to display the data.

4. The method of claim 1, in which a team page is provided by the gamification application.

5. The method of claim 1, wherein the gamification application is implemented using a model-view-controller architecture.

6. A computer readable medium having stored thereon a sequence of instructions which, when executed by a processor causes the processor to execute a method comprising:
  identifying a software application to gamify, the software application being associated with a first computing device;
  providing a gamification application that is external to the software application, the gamification application being associated with a second computing device, the gamification application implementing one or more game features for the software application without modifying the software application, wherein the one or more game features are implemented by:
    identifying an event or activity corresponding to the software application to implement with the one or more game features,
    associating the event or activity corresponding to the software application with at least one game mechanic corresponding to the one or more game features from a library of game mechanics stored at the gamification application, the gamification application comprising websocket connections between the gamification application and the software application that transfer data associated with the event or activity corresponding to the software application to be updated in real-time at the gamification application, and
  storing the data transferred from the software application to the gamification application in a database associated with the gamification application.

7. The method of claim 1, further comprising:
identifying a context associated with the software application, the context pertaining to a category of software applications, the category of software applications being associated with predetermined gamification flows;
implementing, through the gamification application, scoring of various users of the software application, the gamification application tracking an activity of the various users on the gamification application;
configuring the gamification application through application development components, associated with the library of game mechanics, an administrator configuring one or more user interfaces of the gamification application using the application development components;
exporting the data outside the gamification application, the exported data being text or publishing data;
displaying multi-media data through the gamification applications;
providing collaboration features at the gamification application such that the various users collaborate with each other; and
maintaining a rules engine to confirm rules unique to the software application.

8. The method of claim 1, wherein the websocket connections utilize a Javascript library in order to transfer the data.

9. The computer readable medium of claim 6, in which participants use the gamification application to gain points and badges by completing tasks with the software application.

10. The computer readable medium of claim 6, in which a leaderboard or infoboard is provided to display the data.

11. The computer readable medium of claim 6, in which a team page is provided by the gamification application.

12. The computer readable medium of claim 6, wherein the gamification application is implemented using a model-view-controller architecture.

13. A system, comprising:
  a processor;
  a memory comprising computer code executed using the processor, in which the computer code implements:
  identifying a software application to gamify, the software application being associated with a first computing device;
  providing a gamification application that is external to the software application, the gamification application being associated with a second computing device, the gamification application implementing one or more game features for the software application without modifying the software application, wherein the one or more game features are implemented by:
    identifying an event or activity corresponding to the software application to implement with the one or more game features,
    associating the event or activity corresponding to the software application with at least one game mechanic corresponding to the one or more game features from a library of game mechanics stored at the gamification application, the gamification application comprising websocket connections between the gamification application and the software application that transfer data associated with the event or activity corresponding to the software application to be updated in real-time at the gamification application, and
  storing the data transferred from the software application to the gamification application in a database associated with the gamification application.

14. The system of claim 13, in which participants use the gamification application to gain points and badges by completing tasks with the software application.

15. The system of claim 13, in which a leaderboard or infoboard is provided to display the data.

16. The system of claim 13, in which a team page is provided by the gamification application.

17. The system of claim 13, wherein the gamification application is implemented using a model-view-controller architecture.

* * * * *

UNITED STATES PATENT AND TRADEMARK OFFICE
CERTIFICATE OF CORRECTION

PATENT NO. : 9,623,333 B2
APPLICATION NO. : 13/915914
DATED : April 18, 2017
INVENTOR(S) : Pattison et al.

It is certified that error appears in the above-identified patent and that said Letters Patent is hereby corrected as shown below:

On the Title Page

On page 2, Column 2, under Other Publications, Line 18, delete "Congnizant," and insert
-- Cognizant, --, therefor.

In the Specification

In Column 2, Line 52, delete "FIG." and insert -- FIGS. --, therefor.

In Column 7, Line 62, delete "FIG." and insert -- FIGS. --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*